(12) United States Patent
Tsumura et al.

(10) Patent No.: US 6,303,178 B1
(45) Date of Patent: Oct. 16, 2001

(54) SOYBEAN PROTEIN HYDROLYSATES, THEIR PRODUCTION AND USE

(75) Inventors: Kazunobu Tsumura; Yasushi Nakamura; Wataru Kugimiya; Tatsumi Miyazaki; Koichi Kuramori; Kumiko Hoshino; Rie Takee, all of Ibaraki-ken (JP)

(73) Assignee: Fuji Oil Company, Limited, Osaka (JP)

( * ) Notice: Subject to any disclaimer, the term of this patent is extended or adjusted under 35 U.S.C. 154(b) by 0 days.

(21) Appl. No.: 09/362,034

(22) Filed: Jul. 28, 1999

(30) Foreign Application Priority Data

| Jul. 29, 1998 | (JP) | 10-213601 |
| Sep. 30, 1998 | (JP) | 10-277180 |
| Sep. 30, 1998 | (JP) | 10-277303 |
| Dec. 9, 1998 | (JP) | 10-349414 |
| Dec. 28, 1998 | (JP) | 10-371792 |
| Apr. 16, 1999 | (JP) | 11-108797 |
| Apr. 16, 1999 | (JP) | 11-108812 |

(51) Int. Cl.$^7$ ................................................ A23L 1/20
(52) U.S. Cl. .......................... 426/654; 426/656; 426/634; 426/46; 435/68.1
(58) Field of Search .................. 426/656, 634, 426/44, 45, 654; 435/68.1

(56) References Cited

U.S. PATENT DOCUMENTS

| 2,502,482 | 4/1950 | Sair et al. |
| 3,814,816 | 6/1974 | Gunther et al. |
| 4,375,431 | 3/1983 | Bradford et al. |
| 4,757,007 | 7/1988 | Satoh et al. |
| 6,022,702 | * 2/2000 | Tsumura et al. |
| 6,126,973 | * 10/2000 | Tsumura et al. |

FOREIGN PATENT DOCUMENTS

| 0-797-927 | 10/1997 | (EP). |
| 0-797-928 | 10/1997 | (EP). |
| 60-184372 | 9/1985 | (JP). |

OTHER PUBLICATIONS

I. Koshiyama, "Comparison of Acid–induced Conformation Changes between 7S and 11S Globulin in Soybean Seeds", Journal of the Sciences of Food and Agriculture, vol. 23, 1972, pp. 853–859.

C. H. Lee, C. S. Kim and S.P. Lee, "Studies on Enzymic Partial Hydrolysis of Soybean Protein Isolates", Korean Journal of Food and Science and Technology, vol. 16, No. 2, 1984, pp. 228–234.

* cited by examiner

Primary Examiner—Anthony J. Weier
(74) Attorney, Agent, or Firm—Wenderoth, Lind & Ponack, L.L.P.

(57) ABSTRACT

A polypeptide composition obtained by independently hydrolyzing 7S component (β-conglycinin) and 11S component (glycinin) of soybean protein is shown. The polypeptide composition contains hydrolysates of both 7S and 11S components which has good emulsifying and whipping capabilities and is useful for the production of food products including ices, meringues, spread pastes, beverages, farinaceous products, etc.

35 Claims, 2 Drawing Sheets

SOYBEAN PROTEIN HYDROLYSATES, THEIR PRODUCTION AND USE

BACKGROUND OF THE INVENTION

1. Field of the Invention

The present invention relates to soybean protein hydrolysates, their production and use.

2. Description of the Prior Art

As consumers want to avoid use of synthetic food additives, recently, it has been strongly desired to develop substitutes derived from natural products for synthetic food additives, for example, synthetic emulsifying agents and whipping agents. In this respect, soybean protein has been studied heretofore as a natural product for the raw material of substitutes for synthetic emulsifying agents and whipping agents. For example, JP-A 56-26171, JP-A 57-16674 and JP-A 6-197788 disclose enzymatic decomposition of soybean protein under specific conditions to obtain polypeptides to be used mainly as substitutes for synthetic emulsifying agents. In addition, from the viewpoint of soybean protein components, to utilize glycinin acidic subunit (JP-A 63-36748) or glycinin basic subunit has been known. JP-A 49-109551, JP-A 53-58982, JP-A 58-36347, JP-A 60-176549, JP-A 60-184372, JP-A 61-216646 and JP-A 4-311354 disclose enzymatic decomposition of soybean protein under specific conditions to obtain polypeptides to be used mainly as substitutes for synthetic whipping agents.

Further, U.S. Pat. No. 2,502,482 and U.S. Pat. No. 3,814,816 disclose decomposition of acid precipitated soybean protein with pepsin to a specific decomposition degree or more, and to use a supernatant obtained by fractionating polypeptides resulted from enzymatic decomposition of acid precipitated soybean protein with pepsin as a whipping agent. U.S. Pat. No. 4,409,248 discloses fractionation of 7S component of soybean protein and decomposition of the fractionated 7S component with an enzyme to use the resultant polypeptides as a whipping agent. U.S. Pat. No. 4,370,267 discloses fractionation of 11S component of soybean protein and decomposition of the fractionated 11S component with pepsin to use the resultant polypeptides as a whipping agent. Furthermore, U.S. Pat. No. 4,632,903 discloses production of an egg white substitute by two stage decomposition with a microbial enzyme at a neutral pH range.

However, for decomposition of a specific fraction of soybean protein, these known techniques require very complicated steps because the desired specific fraction should be separated beforehand by adjusting pH and salt concentration and then decomposing it. In addition, when additional fractionation is required after decomposition, the problem is lowering of yields of desired polypeptides. Then, it is difficult to obtain polypeptides having both excellent emulsifying and whipping capabilities in a good yield.

The present assignee's EP-A 0 797 927 (corresponding to co-pending U.S. patent application Ser. No. 08/828,939) discloses a soy protein hydrolysate with a low content of β-conglycinin obtained by selective decomposition of β-conglycinin and food products comprising the hydrolysate. The present assignee's EP-A 0 797 928 (corresponding to co-pending U.S. patent application Ser. No. 08/828,393) discloses selective hydrolysis of a specific constituent polypeptide of soybean protein, e.g., glycinin or βconglycinin.

An object of the present invention is to provide a polypeptide composition having both excellent emulsifying and whipping capabilities which can be utilized in various technical fields including food, beverages, cosmetics, toiletries, medicines, and industrial application.

Another object of the present invention is to provide a process for producing the polypeptide composition.

Still another object of the present invention is to provide a food additive utilizing the polypeptide composition and a food product utilizing the food additive.

These objects as well as other objects and advantages of the present invention will become apparent to those skilled in the art from the following description with reference to the accompanying drawings.

SUMMARY OF THE INVENTION

Heretofore, enzymatic decomposition of soybean protein have been attempted intensively to improve functions of soybean protein. In many of these attempts, enzymatic decomposition is carried out under controlled conditions, i.e., by controlling a decomposition degree within a specific range. For example, emulsifying capability can be enhanced by a relatively low decomposition degree and, for enhancing whipping capability, a relatively high decomposition degree is required. Further, for enhancing both emulsifying and whipping capabilities, very strict control of a decomposition degree is required.

On the other hand, it has been known many undenatured proteins are hardly decomposed by a protease and undenatured soybean protein is also hardly decomposed by a protease (S.S. Nielsenn et al., J. Agric. Food Chem., 36, 869 (1988)). Then, in general, soybean protein is subjected to denaturation by heating or by treating with an alcohol prior to enzymatic decomposition.

However, it is very difficult to control enzymatic decomposition of soybean protein to a certain decomposition degree strictly because of hardly controllable denaturation pre-treatment such as excess heating or treatment with an alcohol.

In addition, it has been known that a degree of denaturation caused by external influence is varied according to the constituent components of soybean protein, i.e., 7S component and 11S component.

Figure 1:
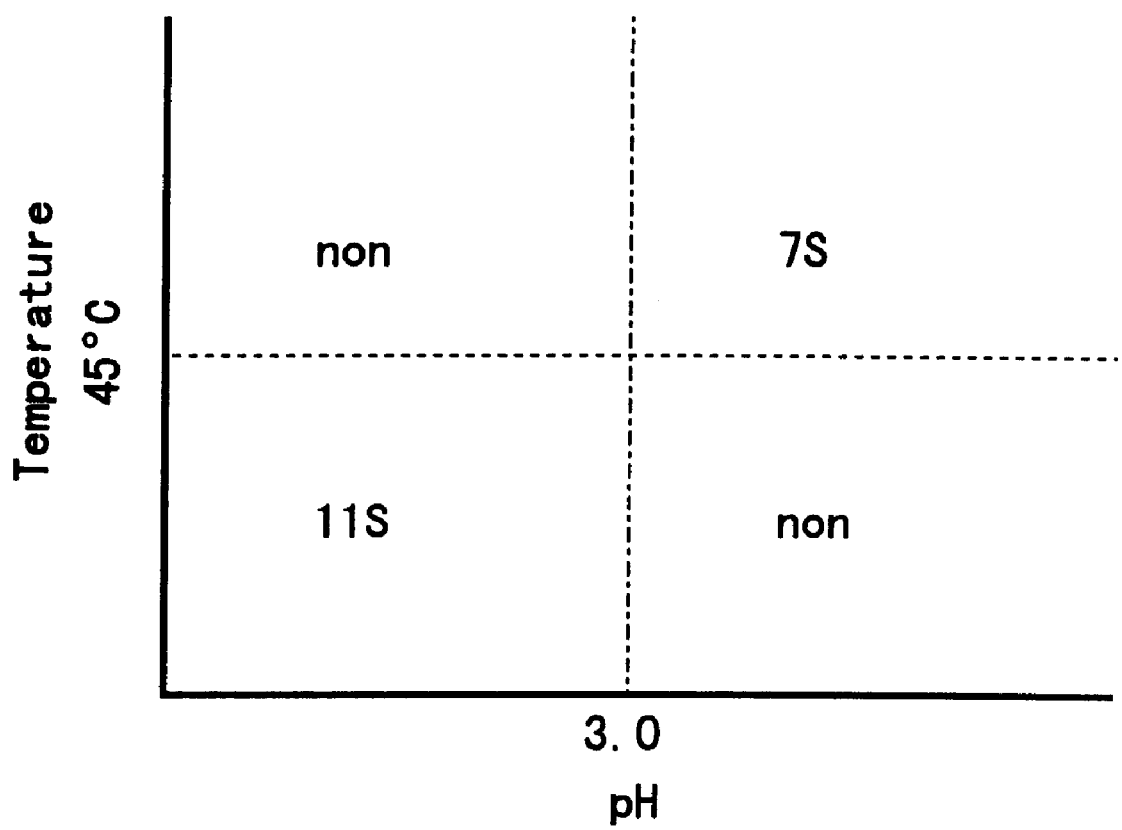
FIG. 1 is a graph illustrating the relation between temperature and pH conditions for selective hydrolysis of 7S and 11S components of soybean protein. The Y-axis represents temperature and the X-axis represents pH. "11S" represents the range where selective hydrolysis of 11S component is taken place at these temperature and pH range. "7S" represents the range where selective hydrolysis of 7S component is taken place at these temperature and pH range. "non" represent the range where non-selective hydrolysis is taken place at these temperature and pH range.

The present inventors have found previously that selective hydrolysis of 7S or 11S component of soybean can be carried out under certain environmental conditions by utilizing the difference in denaturation states of both components. More specifically, the present inventors have found that only 11S component in soybean protein is selectively hydrolyzed by using soybean protein which scarcely has heat history and is scarcely denatured (hereinafter referred to as scarcely denatured soybean protein) as a substrate and carrying out hydrolysis at pH of 3.0 or lower and at reaction temperature of 45° C. or lower, and that only 7S component in soybean protein is selectively hydrolyzed by carrying out hydrolysis at pH of higher than 3.0 and at higher temperature (the ranges "11S" and "7S" in FIG. 1). The present invention has been completed on the basis of this present inventors' previous finding and is characterized in that enzymatic decomposition is carried out by skillfully and reasonably utilizing selective hydrolysis on the basis of the difference in denaturation states of 11S and 7S components.

That is, according to the present invention, there is provided a polypeptide composition comprising independently hydrolyzed 7S (β-conglycinin) and 11S (glycinin) components of soybean protein, and a process for producing a polypeptide composition which comprises independently hydrolyzing 7S and 11S components of soybean protein to obtain the polypeptide composition containing hydrolysates of both components.

In a preferred method for independently hydrolyzing 7S and 11S components, first, either 7S component (βconglycinin) or11S component (glycinin) in soybean protein is selectively hydrolyzed, (1) followed by hydrolyzing a fraction containing the non-hydrolized component without separating the fraction containing the non-hydrolized component from a fraction containing the hydrolyzed component, or (2) followed by separating a fraction containing the non-hydrolized component from a fraction containing the hydrolyzed component, hydrolyzing the separated fraction and mixing the hydrolyzed fraction with the selectively hydrolyzed fraction to obtain the polypeptide composition containing hydrolysates of both components. According to this manner, a polypeptide composition derived from 7S and 11S components of soybean protein and having the following properties can be obtained:

1) molecular weight of its main constituent polypeptide ranging 5,000 to 35,000 upon analyzed by SDS-PAGE;
2) molecular weight of a main peak obtained by gel filtration being about 8,000, and 70% or more of the whole peak area having molecular weight ranging 5,000 to 30,000 and 20% or less of the whole peak area having molecular weight of less than 5,000; and
3) a solubilization degree with 0.22 M trichloroacetic acid (TCA) of 30 to 90%.

The present invention also provides a food additive comprising the polypeptide composition of the present invention and a food product comprising the food additive of the present invention.

DESCRIPTION OF THE PREFERRED EMBODIMENTS

The term "a polypeptide composition" used herein means a mixture of hydrolysates of 7S and 11S components of soybean protein comprising polypeptide components. It may be a product of a successive hydrolysis of 7S and 11S components of soybean protein in a single reaction system. Or, it may be a mixture of 7S and 11S component fractions of soybean protein hydrolyzed in separate reaction systems, respectively.

The main constitute components of the polypeptide composition of the present invention can be analyzed by a known SDS-PAGE. The molecular weight of each polypeptide component can be evaluated by the mobility of standard molecular weight markers. The content of each polypeptide component can be evaluated by determination with a densitometer. The main constitute components of the polypeptide composition comprising components having molecular weight of about 10,000, about 20,000, about 25,000, about 29,000, about 32,000 and the like and, according to the results of determination with a densitometer, the ratio of the area of polypeptides having molecular weight ranging 5,000 to 35,000 to the total area of the polypeptide composition is about 50% or more. This composition of polypeptide components having molecular weight ranging about 5,000 to 35,000 is varied according to a particular mixing ratio of hydrolyzed fractions of 7S and 11S components. For example, when the amount of a selectively hydrolyzed fraction of 11S component is increased, among the above polypeptide components, the amount of polypeptide component having molecular weight of about 10,000 is increased and other components are decreased in comparison with the polypeptide composition composed of both whole fractions obtained by independently and selectively hydrolyzing 7S and 11S components. However, the ratio of the area of polypeptides having molecular weight ranging 5,000 to 35,000 to the total area of the polypeptide composition does not become lower than about 50%.

In the present invention, the evaluation of molecular weight by gel filtration is carried out under the following conditions.

Column: SW3000XL manufactured by Tosoh Corporation (7.6 mm×30 cm)

Eluent: 25 mM phosphate buffer (pH 7) containing 1% SDS and 0.2 M NaCl

Flow rate: 0.8 ml/min.

Detection: absorbance at 220 nm

A sample to be analyzed is dissolved in the above eluent at a concentration of 5% (containing 0.1% mercaptoethanol), followed by boiling for 2 minutes and analyzing it. The molecular weight is evaluated on the basis of the elution time of a standard protein having known molecular weight.

The term "a decomposition degree" used herein means a degree of hydrolysis and is expressed as a solubilization degree with 0.22 M TCA which is generally used for expression of a degree of decomposition of protein, i.e., the ratio of the protein content (nitrogen content) of a portion of a sample solubilized by 0.22 M TCA to the total protein content of the sample. More specifically, 5 ml of 0.44 M TCA solution is added to 5 ml of a sample solution containing 1% by weight of the sample and, after allowing to stand the mixture for 30 minutes, the mixture is centrifuged at 8,000 r.p.m. for 5 minutes and the protein content (A) of the supernatant is determined by Kjeldahl method. On the other hand, 5 ml of distilled water is added to 5 ml of the sample solution containing 1% by weight of the sample and the protein content (B) is determined by Kjeldahl method. The solubilization degree (%) can be calculated as follows.

Solubilization degree (%) with 0.22 M TCA=(A/B)×100

Normally, the solublization degree of the polypeptide composition with 0.22 M TCA is 30 to 90%, preferably 40 to 90%.

Since the polypeptide composition of the present invention has the above properties, it has both excellent emulsifying and whipping capabilities. In the present invention, emulsifying capability is evaluated by determining emulsification activity. The emulsification activity is determined by adding 1 ml of soybean oil to 3 ml of a sample solution (containing 1% by weight of a sample) adjusted to pH 4, pH 5.5 or pH 7, sonicating the solution to prepare an emulsion, diluting the emulsion 1,000 times with 0.1% SDS solution and then measuring turbidity of the solution (absorbance at 500 nm). A higher absorbance shows higher emulsification activity. The polypeptide composition of the present invention has emulsifying capability of 0.15 or higher, preferably 0.2 or higher, more preferably 0.25 or higher at pH 4; 0.5 or higher, preferably 0.6 or higher, more preferably 0.8 or higher at pH 5.5; and 0.8 or higher, preferably 1.0 or higher, more preferably 1.2 or higher at pH 7.

Whipping capability can be evaluated by a whipped lather volume in an aqueous or oil system, and stability of lather. Since severe evaluation is obtained, an oil system is used herein. That is, 4 ml of soybean oil is added to 100 ml of an aqueous solution containing 5% by weight of a sample. The mixture is treated with a homogenizer (manufactured by NIHON SEIKI KAISHA Ltd.) at 10,000 r.p.m. for 1 minute, followed by transferring into a measuring cylinder to measure a lather volume (ml). Stability is evaluated by difference in a lather volume (ml) between that immediately after measurement and that after allowing to stand for 1 hour. The polypeptide composition of the present invention has whipping capability of 250 or more, preferably, 300 or more, more preferably 350 or more.

The independent hydrolysis of 7S and 11S components of soybean protein can be carried out by separating or fractionating 7S and 11S components beforehand to obtain isolated 7S and 11S component fractions, followed by hydrolyzing isolated fractions, separately. However, when this process is carried out in an industrial scale, in general, good separation is not expected, while severe pH and salt concentration control is required. In addition, a yield of the desired hydrolysate is low because of formation of a large amount of undecomposed products. In this respect, either of the above-described two processes is desired. That is, in one preferred aspect of the process, either 7S or 11S components in soybean protein is selectively hydrolyzed (1st decomposition reaction), followed by hydrolyzing a fraction containing the non-hydrolized component (2nd decomposition reaction) without separating the fraction containing the non-hydrolized component from a fraction containing the hydrolyzed component to obtain the polypeptide composition containing hydrolysates of both components. In the other preferred aspect of the process, either 7S or 11S components in soybean protein is selectively hydrolyzed (1st decomposition reaction), followed by separating a fraction containing the non-hydrolized component from a fraction containing the hydrolyzed component, hydrolyzing the separated fraction (2nd decomposition reaction) and then mixing the hydrolyzed fraction with the selectively hydrolyzed fraction to obtain the polypeptide composition containing hydrolysates of both components.

That is, for obtaining the polypeptide composition of the present invention, preferably, the two stage enzymatic decomposition reaction (1st decomposition reaction and 2nd decomposition reaction) is carried out by using soybean containing both main constituent components, 7S and 11S components, as a substrate. More specifically, 7S component is selectively hydrolyzed by the 1st decomposition reaction and then 11S component is hydrolyzed by the 2nd decomposition reaction and vise versa, thereby readily obtaining the novel polypeptide composition having the above excellent properties.

Preferably, the substrate of the selective hydrolysis is undenatured or scarcely denatured soybean protein. Examples thereof include whole soybeans and scarcely denatured soybeans defatted with a solvent such as hexane, etc.; soybean milk and defatted-soybean milk obtained by extracting the whole soybeans or defatted-soybeans with water; scarcely denatured isolated soybean protein obtained by subjecting the soybean milk or defatted-soybean milk to isoelectric point precipitation and recovering the precipitated fraction. Whether protein is denatured with heat, etc. or not can be judged by analysis of the protein with Differential Scanning Calorimetry (DSC) (Nagano et al., J. Agric. Food Chem., 40, 941–944 (1992)). According to this analysis, for example, two main endothermic peaks derived from the main constituent components, 7S and 11S components, are observed in case of isolated soybean protein which is not denatured. However, when isolated soybean protein undergoes excess denaturation, no endothermic peak derived from constituent components is observed. Therefore, presence or absence of denaturation can be readily judged.

There are many kinds of the substrates (soybean protein raw materials). Among them, in particular, isolated soybean protein is preferably used from the viewpoint of taste and functions such as emulsifying and whipping capabilities of the resultant polypeptide composition. That is, the desired isolated soybean protein can be obtained by soaking defatted-soybeans which are scarcely denatured, that is, have the nitrogen solubility index (NSI) of 60 or more, preferably 80 or more, in 7 to 15-fold water at pH ranging 6 to 9, preferably 6.5 to 8.0, extracting soybean protein at 60° C. or lower, preferably 50° C. or lower, removing an "okara (fibrous residue remaining upon extraction of soybean milk)" component, subjecting the resultant defatted soybean milk to isoelectric point precipitation and recovering the precipitated fraction. In addition, it is also preferred to remove or decompose phytic acid, which is undesired for emulsifying and whipping properties of the polypeptide composition as described-hereinafter, during preparation of these defatted soybeans, defatted soybean milk, and isolated soybean protein.

When 11S component is selectively hydrolyzed in the 1st decomposition reaction, desirably, the above-described scarcely denatured soybean protein is used as a substrate and a proteolytic enzyme is added to a protein solution of a protein concentration of 1 to 30% in an amount of 0.001 to 1%, preferably 0.01 to 0.5% based on the solids content of the substrate. The selective hydrolysis is carried out preferably at temperature of 45° C. or lower, more preferably 30 to 40° C. and at pH of 3.0 or lower, more preferably 1.8 to 2.5 within 4 hours, preferably 10 minutes to 2 hours until a solubilization degree with 0.22 M TCA reaches 10 to 50%. As seen from FIG. 1, when the selective hydrolysis is carried out at temperature of higher than 45° C., the reaction system comes up to a non-selective hydrolysis range ("non" of FIG. 1) and, in addition to 11S component, 7S component is liable to be hydrolyzed, which makes selective hydrolysis difficult. In addition, the hydrolysate of 11S component itself becomes lower molecular weight substances, which results in lowering of emulsifying and whipping capabilities. Further, when the reaction time of selective hydrolysis is too long, the hydrolysate of 11S component also becomes lower molecular weight substances and, likewise, this is undesired because physical properties and taste are inferior to those of the above selective hydrolysis.

The proteolytic enzyme used for selective hydrolysis of 11S component may be any proteolytic enzyme which is active at pH 3.0 or lower. For example, there are enzymes derived from animals such as pepsin and cathepsin, and a series of aspartic proteases derived from microorganisms including their commercially available enzyme preparations such as "Newlase F", "Protease M" (manufactured by Amano Pharmaceutical Co., Ltd.), "SUMIZYME LP" (manufactured by SHIN NIHON CHEMICAL CO., LTD.), etc. Among them, pepsin is preferred.

For selectively hydrolyzing 7S component in the 1st decomposition reaction, the above-described soybean protein is used as the substrate and an aqueous solution having a protein concentration of 0.5 to 20% is prepared. A proteolytic enzyme is added to the solution in an amount of 0.001 to 0.5%, preferably 0.01 to 0.5% based on the solids content of the substrate and the hydrolysis is carried out at temperature of 50° C. or higher, preferably 55 to 85° C. at pH of higher than 3.0, preferably 3.5 to 8.0 within 2 hours, preferably for 10 to 30 minutes until a solubilization degree with 0.22 M TCA reaches 10 to 50%. Although this reaction can be carried out at about the isoelectric point of soybean protein, i.e., pH 4 to 5, dispersibility of the substrate is remarkably lowered and enzymatic reactivity is lowered. Then, this pH range is undesired.

The proteolytic enzyme used for selective hydrolysis of 7S component may be any enzyme in so far as it is active at temperature of above 50° C. and up to lower than 90° C., preferably 50 to 85° C. It may be commercially available preparations derived from animal organisms, plants and microorganisms.

For separating the fraction containing a non-hydrolyzed component from the fraction containing the hydrolyzed component after completion of the 1st decomposition reaction, preferably, pH fractionation is employed because the separation is readily and simply carried out. That is, for recovering the selectively hydrolyzed 11S component, the reaction system is adjusted to pH 3 to 5, preferably pH 3.5 to 4.5. On the other hand, for recovering the selectively hydrolyzed 7S component, the reaction system is adjusted to pH 3 to 5, preferably pH 3.5 to 5.5. In each case, the reaction system is subjected to a conventional separation method such as centrifugation, filter press separation, etc. to recover the selectively hydrolyzed component as the supernatant or filtrate fraction and the non-hydrolyzed component as the precipitate fraction, respectively.

Then, the fraction containing non-hydrolyzed component is subjected to the 2nd decomposition reaction. In case that the fraction containing non-hydrolyzed component is a precipitate fraction as described above, water is added thereto and the 2nd decomposition reaction is carried out under conditions different from those of the 1st decomposition reaction. For example, when11S component has been selectively hydrolyzed in the 1st decomposition reaction, the fraction rich in 7S component is subjected to the 2nd decomposition reaction at temperature of higher than 45° C., or at pH of higher than 3 (corresponding to the area "7S" or "non" in FIG. 1). On the other hand, when 7S component has been selectively hydrolyzed in the 1st decomposition reaction, the fraction rich in 11S component is subjected to the 2nd decomposition reaction. In this regard, it is preferred to carry out the 2nd decomposition reaction at pH of 3.0 or lower and at temperature of 45° C. or lower (corresponding to the range "11S" in FIG. 1).

When 7S component has been selectively hydrolyzed in the 1st decomposition reaction and the fraction rich in 11S component is subjected to the 2nd decomposition reaction, 11S component can also be selectively hydrolyzed. Therefore, separation of the fraction containing the non-hydrolyzed component after the 1st decomposition reaction is not necessarily required and, after the 1st decomposition reaction is complete, the reaction system is successively subjected to the 2nd decomposition reaction as it is to obtain the polypeptide composition of the present invention in a very high yield.

The enzymes, reaction time and degree of decomposition of the 2nd decomposition reaction may be the same as those described with respect to each hydrolysis of 7S and 11S components in the above 1st decomposition reaction.

The polypeptide composition of the present invention may be a mixture of the resultant whole decomposition products obtained in the 1st and the 2nd decomposition reactions. Or, either or both of the resultant decomposition products of the 1st and the 2nd decomposition reactions can be purified by a conventional method and they are mixed in an appropriate ratio, for example, 9:1 to 1:9 to obtain the polypeptide composition of the present invention.

When the polypeptide or the resultant decomposition product contains protein having low solubility and/or phytic acid which is a trace component derived from soybean, emulsifying capability (in particular, in an acidic pH range) and whipping capability (in particular, whipping stability) of the polypeptide composition are liable to be adversely affected. Then, for further improving emulsifying and whipping capabilities, it is preferred to remove them.

These components can be removed by adjusting pH of the polypeptide composition without or with addition of 1 to 6% of one or more hydroxides or salts of alkaline earth metal, for example, calcium salts such as calcium hydroxide, calcium chloride, calcium lactate, calcium sulfate, calcium glycerophosphate, calcium citrate, calcium gluconate and calcium phosphate based on the solids content of the polypeptide composition, to pH 2 to 4 or pH 5 to 9, preferably 5.5 to 7.5 and removing insolubles formed. Further, the polypeptide composition is treated with phytase to hydrolyze phytic acid. After treatment with phytase, the polypeptide composition is adjusted to pH 2 to 4 or pH 5 to 9, preferably 5.5 to 7.5 to remove insolubles formed to obtain the desired composition as the supernatant fraction. Even if the above components are removed, 70% or more of solids content can be recovered.

Thus, the polypeptide composition containing both hydrolysates of 7S and 11S components of soybean protein can be readily obtained in a high yield. Since the polypeptide composition of the present invention contains both hydrolysates of 7S and 11S components of soybean protein, it has good physical properties.

The polypeptide composition of the present invention can be adjusted to the desired pH and, if necessary, subjected to pasteurization or sterilization. Before or after pasteurization or sterilization, if necessary, one or more other components selected from fats and oils, emulsifying agents, sugars, other proteinaceous materials and the like can be admixed with the polypeptide composition. The polypeptide composition itself or a mixture thereof with other components can be used as it is or, after concentration and/or drying, to produce a liquid or solid product according to a conventional manner.

The polypeptide composition of the present invention has surface active capability and shows both excellent emulsifying and whipping capabilities. Therefore, as described above, it can be used as an effective component of surfactants, emulsifying agents and whipping agents useful in various technical fields including food, beverages, cosmetics, toiletries, medicines, and industrial application.

For example, the polypeptide composition of the present invention alone or in combination of other food additive components can be used as an effective component of food additives such as those to be added to ices, meringue, nougat, spread pastes, sponge cakes, creams, oil-containing beverages and the like. Likewise, desired various emulsified and/or whipped products containing the polypeptide composition can be obtained. Examples of such products include ices such as ice cream, meringue (e.g., meringue, chiffon. cake, baked meringue), nougat, spread pastes, sponge cake, cream, oil-containing beverages, and the like.

The polypeptide composition can also be used for whipping or whipped food products to give them light mouthfeel and good shape retention.

The amount of the polypeptide composition to be used in emulsified and/or whipped products can be readily and experimentally determined according to a particular purpose. Normally, in many cases, the amount of the polypeptide composition is within the range of 0.05 to 5.0% by weight based on the weight of emulsified and/or whipped products.

In particular, the polypeptide composition of the present invention exhibits superior emulsifying and whipping capabilities to those of conventional polypeptides in an acidic pH range. Therefore, the polypeptide composition of the present invention can preferably be used in products of acidic pH ranges or products to be used in acidic pH ranges, for example, mayonnaise, dressing, coffee whitener, coffee beverages, acidic beverages, sauces (spaghetti sauce, demiglace sauce), and the like. Further, the polypeptide composition has high oil retention capability and can prevent oil separation due to heating or mechanical action, for example, shear force. Then, it can function as an oil retaining agent or the like and can preferably be used as a raw material or component for various fat or oil-containing food products to be heated. Furthermore, the polypeptide composition has antioxidant activity and is useful for an effective component of an antioxidant.

Moreover, the polypeptide composition of the present invention can prevent aging or retrogradation of starches (farinaceous products) containing wheat flour and/or starch, in particular, batter products (for tempura, pork cutlets, pancakes, etc.) and is effective for keeping soft mouthfeel after storage. Then, it can be used as a food additive to be added to starches or their component. For example, for batter products, the polypeptide composition of the present invention can be used in an amount of 0.05 to 5.0% by weight, preferably 0.1 to 3.0% by weight.

The following Examples further illustrate the present invention in detail, but are not to be construed to limit the scope thereof. In the Examples, all the percents and parts are by weight unless otherwise stated.

PREPERATION EXAMPLE 1 (T-1)

To scarcely denatured defatted-soybean flakes (NSI 90, manufactured by Fuji Oil Co., Ltd.) was added 10-fold warm water at 40° C. and the mixture was adjusted to-pH 7.0 with aqueous sodium hydroxide. The mixture was gently stirred for 1 hour to extract soybean protein and centrifuged to separate a soluble fraction, i.e., defatted-soybean milk from an insoluble fraction, i.e., "okara". The resultant defatted-soybean milk was adjusted to pH 4.5 with hydrochloric acid. The resultant protein precipitate was recovered by centrifugation to obtain isolated soybean protein curd. This isolated soybean protein curd had a solids content of 40% by weight and the purity of crude protein in the solids was 95% by weight. The results of its DSC analysis showed two endothermic peaks.

Then, water was added to the isolated soybean protein curd and the mixture was adjusted to pH 2.0 with hydrochloric acid and an isolated protein concentration of 10% by weight. To the resultant isolated protein solution was added pepsin (manufactured by Biocon (Japan) Ltd.) in an amount of 200 mg/1 liter of the solution and hydrolysis (1st decomposition reaction) was carried out at 37° C. for 30 minutes. The reaction mixture was subjected to SDS-PAGE. A As seen from FIG. 2, Lane 2, 11S component in the soybean protein was selectively hydrolyzed, and the band having the mobility corresponding to 11S component was disappeared, while bands having mobility corresponding to polypeptides derived from iiS component and corresponding to undecomposed 7S component were observed.

The reaction mixture of the 1st decomposition reaction was adjusted to pH 4.5 with aqueous sodium hydroxide and centrifuged to separate a supernatant fraction containing decomposed 11S component from a precipitate fraction rich in 7S component.

The solubilization degree with 0.22 M TCA of the 1st decomposition reaction mixture was 25%, and that of the supernatant fraction was 72%. The volume recovery rate of the supernatant fraction was 80%, and the solids recovery rate of the supernatant fraction was 24%.

To the precipitate fraction was added water and the mixture was adjusted to pH 2.0 with hydrochloric acid and a solids content of 7% by weight. To this solution was added pepsin in an amount of 100 mg/1 liter of the solution and, again, hydrolysis (the second decomposition reaction) was carried out at 60° C. for 20 minutes. The solubilization degree with 0.22 M TCA of the 2nd decomposition reaction mixture was 46%. The 2nd decomposition reaction mixture was mixed with the above supernatant fraction of the 1st decomposition reaction mixture and adjusted to pH 6.5 with an aqueous sodium hydroxide according to the same manner as described in the above with respect to the 1st decomposition reaction, followed by spray-drying to obtain the desired polypeptide composition (T-1). The analysis of composition of the resultant polypeptide composition is as follows.

crude protein: 84% ash: 11% moisture: 5% solubilization degree with 0.22 M TCA: 52%

PREPARATION EXAMPLE 2 (T-2)

To the mixture of the supernatant fraction of the 1st decomposition reaction mixture and the 2nd decomposition reaction mixture obtained in the above Preparation Example 1 was added calcium hydroxide in an amount of 3% by weight based on the solids of the mixture and the resultant mixture was adjusted to pH 6.5 with aqueous sodium hydroxide. This was subjected to HTST (high temperature short time) heat treatment at 140° C. for 7 seconds and then cooled to room temperature. Insolubles were removed by centrifugation at 5,000 G for 10 minutes to obtain a supernatant fraction. The resultant fraction was spray-dried to obtain the desired polypeptide composition (T-2). The analysis of the composition of the polypeptide composition is as follows:

crude protein: 76% ash: 15% moisture: 5% solubilization degree with 0.22 M TCA: 70% solids recovery rate: 71%

PREPARATION EXAMPLE (T-3)

Water was added to the isolated soybean protein curd obtained in Preparation Example 1 and the mixture was adjusted to pH 3.5 with hydrochloric acid and an isolated soybean protein concentration of 10% by weight. To this solution was added pepsin (manufactured by Biocon (Japan) Ltd.) in an amount of 200 mg/1 liter of the solution and hydrolysis (1st decomposition reaction) was carried out at 70° C. for 30 minutes. The results of SDS-PAGE (FIG. 2) showed that 7S component in soybean protein was selectively hydrolyzed, and the band having the mobility corresponding to 7S component was disappeared, while bands having mobility corresponding to polypeptides derived from 7S component and corresponding to undecomposed 11S component were observed. The reaction mixture was cooled to 37° C. and adjusted to pH 2.0 with hydrochloric acid. To this solution was added pepsin in an amount of 200 mg/1 liter of the solution and, again, hydrolysis (2nd decomposition reaction) was carried out at 37° C. for 30 minutes. The resultant reaction mixture was adjusted to pH 6.5 with aqueous sodium hydroxide and spray-dried to obtain the desired polypeptide composition (T-3). The analysis of composition of the polypeptide composition are as follows.

crude protein: 85% ash: 10% moisture: 5% solubilization degree with 0.22 M TCA: 56%

Figure 2:
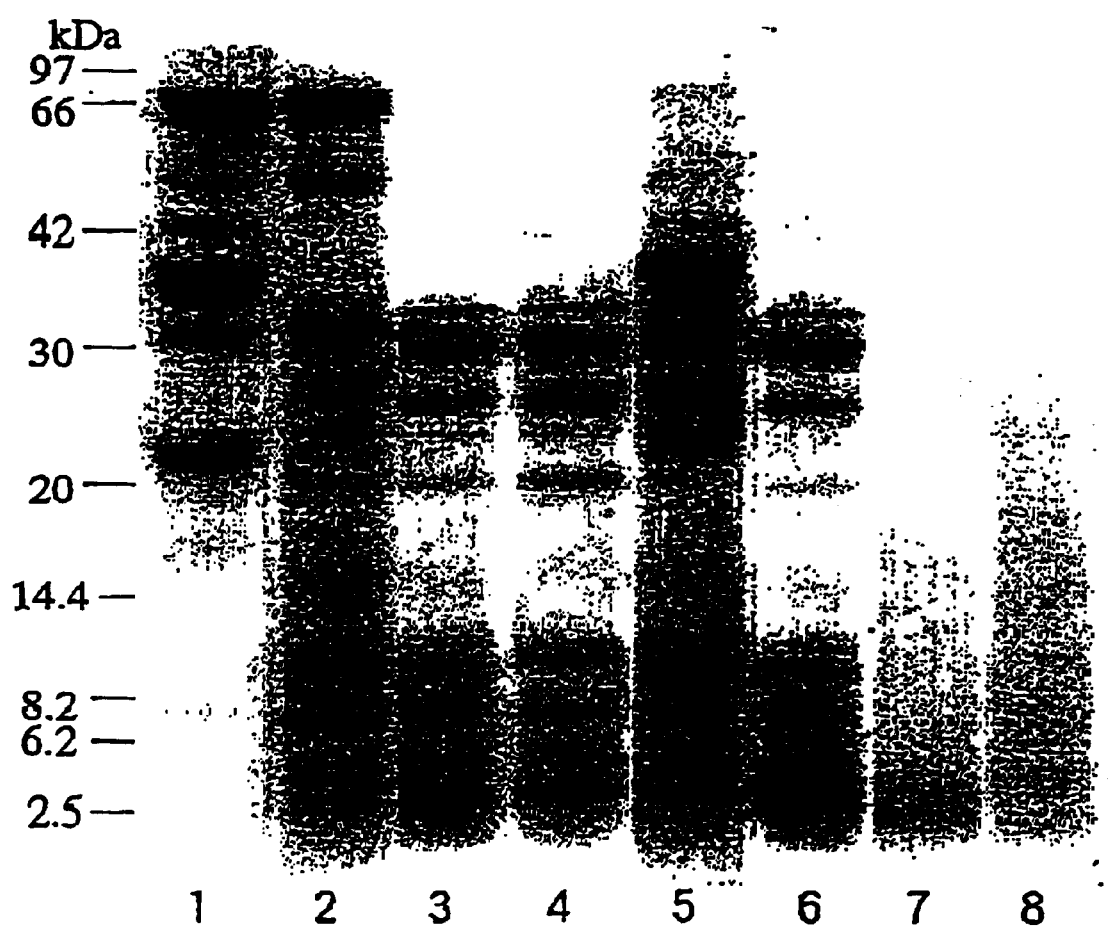
FIG. 2 shows the results of mercaptoethanol-containing SDS polyacrylamide gel electrophoresis (hereinafter abbreviated to SDS-PAGE) of main constituent components of samples of the polypeptide compositions obtained in Preparation Examples 1 (T-1), 2 (T-2) and 3 (T-3) and Comparative Preparation Examples 1 (t-1) and 2 (t-2) hereinafter for evaluating the molecular weight. Lane 1 is undecomposed soybean protein, Lane 2 is the 1st decomposition reaction mixture of T-1, Lane 3 is the polypeptide composition of T-1, Lane 4 is the polypeptide composition of T-2, Lane 5 is the 1st decomposition reaction mixture of T-3, Lane 6 is the polypeptide composition of T-3, Lane 7 is the polypeptide composition of t-1, and Lane 8 is the polypeptide composition of t-2.

The results of SDS-PAGE analysis are shown by FIG. 2.

The results of molecular weight evaluation by gel filtration are shown in Table 1. Further, the results of emulsifying capability and whipping capability are shown in Tables 2 and 3, respectively.

TABLE 1

Evaluation of molecular weight

| Sample | Area % | | |
|---|---|---|---|
| Preparation Example No. | M.W.* 30,000–5,000 | M.W. 5,000> | Main peak M.W. (about) |
| 1 (T-1) | 94 | 1.0 | 8,000 |
| 2 (T-2) | 89 | 9.6 | 8,000 |
| 3 (T-3) | 90 | 5.6 | 8,000 |

M.W.: molecular weight

TABLE 2

Evaluation of emulsifying capability

| Sample Preparation | Emulsifying capability (absorbance at 500 nm) | | |
|---|---|---|---|
| Example No. | pH 4.0 | pH 5.5 | pH 7.0 |
| 1 (T-1) | 0.36 | 0.65 | 1.4 |
| 2 (T-2) | 0.52 | 0.93 | 1.8 |
| 3 (T-3) | 0.25 | 0.60 | 1.2 |

TABLE 3

Evaluation of whipping capability

| Sample | Whipping capability (ml) | |
|---|---|---|
| Preparation Example No. | Immediately after whipping | After 1 hour |
| 1 (T-1) | 460 | 415 |
| 2 (T-2) | 600 | 560 |
| 3 (T-3) | 400 | 390 |

As is seen from FIG. 2 and Tables 1 to 3, the polypeptide composition of the present invention is mainly posed of a polypeptide component having a specific molecular weight and the composition has high emulsifying and whipping capabilities at respective pH and stable whipping properties.

COMPARATIVE PREPARATION EXAMPLE 1 (t-1)

Water was added to the isolated soybean curd obtained in Preparation Example 1 and the mixture adjusted to pH 2.0 with hydrochloric acid and an isolated soybean protein concentration of 10% by weight. To this solution was added pepsin in an amount of 200 mg/1 liter of the solution and hydrolysis was carried out at 60° C. for 2 hours. When the reaction mixture was analyzed by SDS-PAGE, not only 11S component but also 7S component were decomposed. The reaction mixture was adjusted to pH 6.5 with aqueous sodium hydroxide and centrifuged to separate a supernatant fraction. The supernatant fraction was spray-dried to obtain a polypeptide composition (t-1).

COMPARATIVE PREPARATION EXAMPLE 2 (t-2)

The pepsin hydrolyzed reaction mixture obtain in Comparative preparation Example 1 was adjusted to pH 4.5 with aqueous sodium hydroxide and centrifuged to separate a supernatant fraction from a precipitate fraction. Water was added to the precipitate fraction and the mixture was adjusted to pH 2.0 with hydrochloric acid and to a solids concentration of 7% by weight. Pepsin was added to this solution in an amount of 100 mg/1 liter of the solution and, again, hydrolysis was carried out at 60° C. for 20 minutes. The resultant hydrolyzed mixture was mixed with the above supernatant fraction. The resultant mixture was adjusted to pH 6.5 with aqueous sodium hydroxide and spray-dried to obtain a polypeptide composition (t-2).

The results of molecular weight evaluation by gel filtration are shown in Table 4 and evaluation of emulsifying and whipping capabilities are shown in Tables 5 and 6, respectively.

TABLE 4

Evaluation of molecular weight

| Sample Comparative | Area % | | Main peak molecular |
|---|---|---|---|
| Preparation Example No. | M.W. 30,000–5,000 | M.W. 5,000> | weight (about) |
| 1 (t-1) | 31 | 65 | 3,000 |
| 2 (t-2) | 40 | 42 | 5,000 |

TABLE 5

Evaluation of emulsifying capability

| Sample Comparative Preparation Example No. | Emulsifying capability (absorbance at 500 nm) | | |
| --- | --- | --- | --- |
| | pH 4.0 | pH 5.5 | pH 7.0 |
| 1 (t-1) | 0.10 | 0.36 | 0.51 |
| 2 (t-2) | 0.15 | 0.30 | 0.72 |

TABLE 6

Evaluation of whipping capability

| Sample Comparative Preparation Example No. | Whipping capability (ml) | |
| --- | --- | --- |
| | Immediately after whipping | After 1 hour |
| 1 (t-1) | 230 | 130 |
| 2 (t-2) | 290 | 95 |

As is seen from Tables 4 to 6, the polypeptide compositions of Comparative Preparation Examples 1 and 2 are mainly composed of low molecular weight polypeptides and have inferior emulsifying and whipping capabilities.

PRODUCT EXAMPLE 1

Mayonnaise Type Dressing

According to the formulation shown in Table 7, a mayonnaise type dressing was produced by using any one of polypeptide compositions obtained in Preparation Examples 1 to 3 and Comparative Preparation Examples 1 and 2. All the ingredient except salad oil were mixed and then the mixture was emulsified with addition of salad oil to produce the mayonnaise type dressing. The dressing thus produced was evaluated by measuring its average particle size with a laser diffraction particle size distribution analyzer LA-500 (manufactured by HORIBA, Ltd.).

TABLE 7

| Ingredients | Parts by weight |
| --- | --- |
| Salad oil | 60 |
| Vinegar | 15 |
| Polypeptide composition | 2 |
| Flavor and seasoning | 4 |
| Spices | 1 |
| Water | 18 |

The results of measurement of average particle size are shown in Table 8.

TABLE 8

Average particle size

| Polypeptide composition | Average particle size ($\mu$m) |
| --- | --- |
| T-1 | 10 |
| T-2 | 6 |
| T-3 | 11 |
| t-1 | separation |
| t-2 | 44 |

The products obtained by using the polypeptide compositions of T-1, T-2 and T-3 had mayonnaise like appearance. The other products showed oil separation or had tendency of oil separation and were too soft. Comparison of average particle sizes supported this observation.

Thus, the polypeptide composition of the present invention is sufficient quality for an emulsifying agent of a mayonnaise type dressing.

PRODUCT EXAMPLE 2

Coffee Whitener

According to the formulation shown in Table 9, a coffee whitener was produced by using any one of polypeptide compositions obtained in Preparation Examples 1 to 3 and Comparative Preparation Examples 1 and 2. All the ingredients were mixed and emulsified with a dispersion sonicator at 60° C. to produce a coffee whitener.

TABLE 9

| Ingredients | Parts by weight |
| --- | --- |
| Hydrogenated rapeseed oil | 30 |
| Polypeptide composition | 4 |
| Water | 66 |

Thirty gram of a commercially available instant coffee (Nestle) and 50 g of sugar were dissolved in 1 liter of water (1 liter, adjusted to pH 7) and heated to 80 to 85° C. To 100 ml of this hot coffee solution was added 10 ml of the above each coffee whitener and, after stirring, the mixture was autoclaved at 120° C. for 10 minutes. After heating, the emulsified state was observed to evaluate quality of each coffee whitener. The results are shown in Table 10.

TABLE 10

Evaluation of quality of coffee whitener

| Polypeptide composition | Emulsified state |
| --- | --- |
| T-1 | somewhat separated |
| T-2 | good |
| T-3 | somewhat separated |
| t-1 | completely separated, agglomerated |
| t-2 | completely separated, agglomerated |

As is seen from Table 10, the polypeptide composition of the present invention can maintain good emulsified state and gives good heat resistance. In particular, the coffee whitener using the polypeptide composition T-2 from which insolubles have been removed has superior quality.

PRODUCT EXAMPLE 3

Nougat

According to the formulation shown in Table 11, a whipped candy, nougat, was produced using any one of the polypeptide compositions obtained in Preparation Examples 1 to 3 and Comparative Preparation Examples 1 and 2.

TABLE 11

| Ingredients | Parts by weight |
| --- | --- |
| Sugar | 40 |
| Starch syrup (Brix 75) | 35 |
| Polypeptide composition | 1 |
| Hydrogenated rapeseed oil | 3 |
| Water | 21 |

Nine parts of water was added to 1 part of the polypeptide composition to prepare 100 g of a solution containing 10% by weight of the polypeptide composition. The solution was whipped at a high speed revolution for 5 minutes with Kenwood Mixer (Model Pro KM-230 manufactured by Aikosha Seisakusho) equipped with whipper blades to prepare a lather mass having meringue like appearance. Then, 870 g of a mixture of all the ingredients except hydrogenated rapeseed oil which had been heated to 130° C. was mixed with the lather mass. To the mixture was added 30 g of hydrogenated rapeseed oil and the resultant mixture was kneaded with Kenwood Mixer at a low speed until a uniform mass was formed to prepare the nougat. The specific gravity of the lather mass, specific gravity of the nougat immediately after preparation and shape retention of the nougat one day after preparation were evaluated. The results are shown in Table 12.

TABLE 12

Evaluation of nougat

| Polypeptide Composition | Specific gravity of lather mass | Specific gravity of nougat | Shape retention of nougat |
| --- | --- | --- | --- |
| T-1 | 0.038 | 0.545 | good |
| T-2 | 0.030 | 0.298 | excellent |
| T-3 | 0.042 | 0.602 | good, somewhat loose |
| t-1 | 0.052 | 0.689 | loose, bad |
| t-2 | 0.070 | 0.820 | loose, bad |

As is seen from Table 12, the polypeptide compositions of T-1 to T-3 exhibit good whipping properties and improve heat resistance and stability against oil of whipped lather in the nougat to produce the nougat having light mouthfeel and good shape retention.

PRODUCT EXAMPLE 4

Spread Paste

According to the formulation shown in Table 13, creamy pastes (each 3 kg scale) were produced. In Table 13, the amount of the ingredients are percents by weight.

TABLE 13

| | Product Examples | | | | Comparative Product Examples | | | | |
| --- | --- | --- | --- | --- | --- | --- | --- | --- | --- |
| Ingredients | 4-1-1 | 4-1-2 | 4-2 | 4-3 | 1 | 2 | 3 | 4 | 5 |
| Polypeptide composition | T-1 0.5 | T-1 2.0 | T-2 2.0 | T-3 2.0 | C-1 2.0 | C-2 2.0 | C-3 2.0 | C-4 2.0 | — 0 |
| Egg yolk | 4.0 | 8.0 | 8.0 | 8.0 | 4.0 | 4.0 | 4.0 | 4.0 | 4.0 |
| Lacto-albumin | 1.5 | 1.0 | 1.0 | 1.0 | 1.0 | 1.0 | 1.0 | 1.0 | 2.0 |
| Hydrogenated rapeseed oil | 15.0 | 15.0 | 15.0 | 15.0 | 15.0 | 15.0 | 15.0 | 15.0 | 15.0 |
| Skimmed milk powder | 4.0 | 4.0 | 4.0 | 4.0 | 4.0 | 4.0 | 4.0 | 4.0 | 4.0 |
| Refined sugar | 16.0 | 16.0 | 16.0 | 16.0 | 16.0 | 16.0 | 16.0 | 16.0 | 16.0 |
| Dextrin | 10.0 | 10.0 | 10.0 | 10.0 | 10.0 | 10.0 | 10.0 | 10.0 | 10.0 |
| Modified starch | 4.6 | 4.6 | 4.6 | 4.6 | 4.6 | 4.6 | 4.6 | 4.6 | 4.6 |
| Water | 44.4 | 39.4 | 39.4 | 39.4 | 43.4 | 43.4 | 43.4 | 43.4 | 44.4 |
| Total | | | | | 100.0 | | | | |

The polypeptide compositions T-1, T-2 and T-3 are those obtained by the above Preparation Examples 1 to 3. C-1 is isolated soybean protein. C-2 to C-4 are prepared as follows.

C-2: Water was added to isolated soybean protein curd and adjusted to pH 2.0 with hydrochloric acid and an isolated soybean protein concentration of 10% by weight. To this solution was added pepsin (manufactured by Biocon (Japan) Ltd.) in an amount of 200 mg/1 liter of the solution and hydrolysis was carried out at 60° C. for 2 hours. After completion of hydrolysis, the reaction mixture had a solubilization degree with 0.22 M TCA of 51%. SDS-PAGE analysis of this reaction mixture showed decomposition of not only 11S component but also 7S component. The reaction mixture was adjusted to pH 7.0 with aqueous sodium hydroxide. After heat sterilization, the reaction mixture was spray-dried to obtain an acidic hydrolysate of isolated soybean protein without selective hydrolysis.

C-3: Water was added to isolated soybean protein curd and adjusted to pH 7.5 with aqueous sodium hydroxide and an isolated soybean protein concentration of 10% by weight. To this solution was added alkaline protease (Protin A10LF manufactured by Daiwa Fine Chemicals Co., Ltd.) in an amount of 300 mg/1 liter of the solution and hydrolysis was carried out at 55C for 30 minutes. After completion of hydrolysis, the reaction mixture had a solubilization degree with 0.22 M TCA of 19%. SDS-PAGE analysis of this reaction mixture showed decomposition of not only 11S component but also 7S component. After heat sterilization, the reaction mixture was spray-dried to obtain a neutral hydrolysate of isolated soybean protein without selective hydrolysis.

C-4: Water was added to isolated soybean protein curd and adjusted to pH 2.0 with hydrochloric acid and an isolated soybean protein concentration of 10% by weight. To this solution was added pepsin (manufactured by Biocon (Japan) Ltd.) in an amount of 200 mg/1 liter of the solution and hydrolysis was carried out at 37° C. for 30 minutes to selectively hydrolyze 11S component. Then, the reaction mixture was adjusted to pH 7.0 with aqueous sodium hydroxide without fractionation. After heat sterilization, the reaction mixture was spray-dried to obtain a hydrolysate of isolated soybean protein.

According to the formulation of Table 13, modified starch (THERM FLO manufactured by Nippon NSC Ltd.) was dispersed and swelled in water at 55° C. and to the resultant dispersion were added lactoalbumin (SunlactoN5 manufactured by TAIYO KAGAKU CO., LTD.), skimmed milk powder (used as proteinaceous raw material and for giving milky flavor), refined sugar, dextrin and isolated soybean protein (C-1) or a polypeptide composition (the above T-1, T-2 or T-3, or C-2, C-3 or C-4 as described hereinafter) little by little with stirring by a homomixer (TK. HOMOMIXER, MARK 2, MODEL 2.5 manufactured by TOKUSHU KIKA KOGYOU CO.) to disperse and dissolved these ingredients. Hydrogenated rapeseed oil previously melted and egg yolk (frozen egg yolk "Goldyork" manufacture by Q.P. Corporation) were added to the resultant mixture, followed by stirring thoroughly to disperse them. The resultant dispersion was homogenized with a high pressure homogenizer (HA-4160 manufactured by SANWA MACHINE CO., LTD.) under high pressure (200 kg/cm$^2$). Then, to the homogenized mixture were added citric acid, sodium citrate and potassium sorbate previously dissolve in water to adjust to pH 5.7 to 5.9. To the resultant paste were added appropriate amounts of a flavor and a colorant, followed by heat treatment to obtain a creamy paste. The heat treatment was carried out at 100° C. for 2 minutes by indirect heating with steam using a jacketed vertical vacuum kneader. Then, the paste was allowed to stand at room temperature overnight and then physical properties of the product were evaluated.

The creamy paste was placed in a squeeze bag and 5 g of the paste was squeezed out therefrom to put the paste in a liner shape on filter paper, followed by canning together with 1 g of water. This was steamed and baked in an oven at 200° C. for 10 minutes. Shape retention and an oil smear were observed to evaluate physical properties.

Five panelists evaluated by scoring each creamy paste (5 grades) and the results were expressed by the average score. Regarding shape retention, the paste maintaining the original liner shape even after baking was scored 5 (the best) and, regarding an oil smear, size of a smear was observed. A smaller smear on the filter paper was better and the paste exhibiting no smear was scored 5. In addition, oil separation (oil ooze on the surface of the paste) immediately after heat treatment during production was also observed to evaluate the properties. The results 5 are shown in Table 14.

TABLE 14

| Evaluation | Product Examples | | | | Comparative Product Examples | | | | |
|---|---|---|---|---|---|---|---|---|---|
|  | 4-1-1 | 4-1-2 | 4-2 | 4-3 | 1 | 2 | 3 | 4 | 5 |
| Oil* separation | − | − | − | − | + | ± | ± | ± | − |
| Shape retention | 4.8 | 4.7 | 4.8 | 4.5 | 1.5 | 2.2 | 1.9 | 2.6 | 3.2 |
| Oil smear | 4.7 | 4.5 | 4.7 | 4.2 | 1.0 | 2.2 | 1.9 | 2.0 | 3.8 |
| Mouth-feel | 4.7 | 4.7 | 4.7 | 4.7 | 3.8 | 4.5 | 4.2 | 4.4 | 4.5 |

TABLE 14-continued

| Evaluation | Product Examples | | | | Comparative Product Examples | | | | |
|---|---|---|---|---|---|---|---|---|---|
|  | 4-1-1 | 4-1-2 | 4-2 | 4-3 | 1 | 2 | 3 | 4 | 5 |
| Flavor | 4.2 | 4.8 | 4.7 | 4.8 | 3.8 | 3.6 | 3.9 | 3.9 | 3.9 |
| Overall** evaluation | A | A | A | A | D | C | C | C | C |

*: oil separation immediately after heat treatment.
−: no oil separation, ±: a little oil separation, +: oil separation
**: The overall evaluation is based on the following criteria.
A: excellent, B: good, C: not good, D: bad As is seen from Table 14, only the creamy paste obtained by using the polypeptide composition of the present invention has both excellent flavor and excellent physical properties. On the other hand, any favorable result cannot be obtained in the product produced by using the isolated soybean protein, hydrolysate of isolated soybean protein or lactoalbumin alone.

These results are considered to be brought about by excellent emulsifying capability of the polypeptide composition of the present invention, i.e., that obtained by two-stage enzymatic hydrolysis of a soybean substrate containing both 7S and 11S components to independently hydrolyze both components. Such excellent emulsifying capability prevents demulsification caused by addition of egg yolk and improves shape retention and oil smear.

The above examples and comparative examples were carried out in a laboratory scale. Then, for evaluating usefulness in an industrial scale, 50 kg of the above formulation of Product Example 4-1-2 was repeated.

The mixture was prepared in a 100 liter dissolution tank equipped with vertical propeller blades. According to the same manner as described above, modified starch was dispersed and swelled in water at 55° C. and to the resultant dispersion were added lactoalbumin, skimmed milk powder, refined sugar, dextrin and the polypeptide composition little by little with stirring to disperse and dissolved these ingredients. Hydrogenated rapeseed oil previously melted and egg yolk were added to the resultant mixture, followed by stirring thoroughly to disperse them. The resultant dispersion was homogenized with a high pressure homogenizer under high pressure (200 kg/cm$^2$). Then, to the homogenized mixture were added citric acid, sodium citrate and potassium sorbate previously dissolved in water to adjust to pH 5.8. The heat treatment was carried out at 110° C. for 25 seconds by indirect heating with ONLATOR HAX0604DA0604-2 (manufactured by Sakura Seisakusho, LTD.). This treatment was carried out at high temperature and high pressure and the product was scraped out by a vertical screw from a jacketed barrel under back pressure of 2.0 to 3.0 kg/cm$^2$. Steam of 1.2 kg/Cm2 was led into the outer jacket of the barrel. After heat treatment, the product was cooled at 70° C. by the same system.

Physical properties of the creamy paste thus obtained were evaluated according to the same manner as described above. The results are shown in Table 15.

TABLE 15

| | |
|---|---|
| Oil separation | — |
| Shape retention | 4.5 |
| Oil smear | 4.2 |
| Mouthfeel | 4.7 |

TABLE 15-continued

| Flavor | 4.8 |
|---|---|
| Overall evaluation | A |

The results of Table 15 are the same as those of Table 14 and show that the product has good quality and the desired advantages of the present invention can also be obtained in an industrial scale.

PRODUCT EXAMPLE 5

Emulsifying Agent for Ices and Ices Containing the Same

According to the formulation shown in Table 16, ice creams were produced (each 5.0 kg scale).

TABLE 16

| Product Example No. | Ingredient (% by weight) | | |
|---|---|---|---|
| | MS | MO | Polypeptide composition |
| 5-1-1 | — | — | 0.3 (T-1) |
| 5-1-2 | 0.1 | — | 0.2 (T-1) |
| 5-1-3 | 0.2 | — | 0.1 (T-1) |
| Comparative Product Example 6 | 0.3 | — | — |
| Comparative Product Example 7 | 0.2 | 0.1 | — |
| Comparative Product Example 8 | 0.1 | 0.2 | — |
| Comparative Product Example 9 | — | 0.3 | — |
| 5-2 | — | — | 0.3 (T-2) |
| 5-3 | — | — | 0.3 (T-3) |
| 5-1-4 | — | — | 0.4 (T-1) |
| 5-1-5 | — | — | 0.6 (T-1) |
| 5-1-6 | — | — | 0.8 (T-1) |

MS: stearic acid monoglyceride
MO: oleic acid monoglyceride

Product Example 5-1-1: An ice cream mix composed of skimmed milk (9 parts), sugar (12 parts), powdered starch syrup (3.45 parts), fats and oils (coconut oil) (8 parts), water (67.25 parts) and the polypeptide composition (T-1) (0.3 part) was heated to 70° C. and the mixture was stirred with a homomixer (manufactured by TOKUSHU KIKA KOGYO CO.) at 10,000 r.p.m. for 30 minutes to pre-emulsify The mixture. Then, this ice cream mix was homogenized under pressure of 100 kg/cm$^2$ and sterilized at 85° C. for 30 seconds. The mixture was cooled quickly and aged at 5° C. overnight. After aging, the mixture was subjected to freezing and filled in a 100 ml cup, followed by quick-freezing and storing at −25° C. for 3 days.

The ice cream thus obtained was evaluated with respect to its overrun, shape retention and organoleptic properties. Shape retention was evaluated by measuring an amount of drops from the ice cream standing at 30° C. under relative humidity of 80% for a given period of time and calculating the ratio (%) of the amount to the original weight of the ice cream. The organoleptic evaluation was carried out by 5 expert panelists on the basis of good flavor or bad flavor.

Product Example 5-1-2: According to the same manner as described in Product Example 5-1-1, an ice cream was produced except that 0.2 part of the polypeptide composition (T-1) and 0.1 part of stearic acid monoglyceride were used. Likewise, the ice cream was evaluated.

Product Example 5-1-3: According to the same manner as described in Product Example 5-1-1, an ice cream was produced except that 0.1 part of the polypeptide composition (T-1) and 0.2 part of stearic acid monoglyceride were used. Likewise, the ice cream was evaluated.

Comparative Product Example 6: According to the same manner as described in Product Example 5-1-1, an ice cream was produced except that no polypeptide composition (T-1) was used and 0.3 part of stearic acid monoglyceride was used as an emulsifying agent. Likewise, the ice cream was evaluated.

Comparative Product Example 7: According to the same manner as described in Product Example 5-1-1, an ice cream was produced except that no polypeptide composition (T-1) was used and 0.2 part of stearic acid monoglyceride and 0.1 part of oleic acid monoglyceride were used as emulsifying agents. Likewise, the ice cream was evaluated.

Comparative Product Example 8: According to the same manner as described in Product Example 5-1-1, an ice cream was produced except that no polypeptide composition (T-1) was used and 0.1 part of stearic acid monoglyceride and 0.2 part of oleic acid monoglyceride were used as emulsifying agents. Likewise, the ice cream was evaluated.

Comparative Product Example 9: According to the same manner as described in Product Example 5-1-1, an ice cream was produced except no polypeptide composition (T-1) was used and 0.3 part of oleic acid monoglyceride was used emulsifying agents. Likewise, the ice cream was evaluated.

Product Example 5-2: According to the same manner as described in Product Example 5-1-1, an ice cream was produced except that 0.3 part of the polypeptide composition (T-2) was used instead of the polypeptide composition (T-1). Likewise, the ice cream was evaluated.

Product. Example 5-3: According to the same manner as described in Product Example 5-1-1, an ice cream was produced except that 0.3 part of the polypeptide composition (T-3) was used instead of the polypeptide composition (T-1). Likewise, the ice cream was evaluated.

Product Example 5-1-4: According to the same manner as described in Product Example 5-1-1, an ice cream was produced except that 0.4 part of the polypeptide composition (T-1) was used. The total amount was adjusted by water. Likewise, the ice cream was evaluated.

Product Example 5-1-5: According to the same manner as described in Product Example 5-1-1, an ice cream was produced except that 0.6 part of the polypeptide composition (T-1) was used. The total amount was adjusted by water. Likewise, the ice cream was evaluated.

Product Example 5-1-6: According to the same manner as described in Product Example 5-1-1, an ice cream was produced except that 0.8 part of the polypeptide composition (T-1) was used. The total amount was adjusted by water. Likewise, the ice cream was evaluated.

The results of evaluation are shown in Table 17.

TABLE 17-1

| Product Example No. | Overrun (%) | Shape retention (%) | | | |
|---|---|---|---|---|---|
| | | After 30 min. | After 50 min. | After 70 min. | After 90 min. |
| 5-1-1 | 78 | 4.5 | 10.6 | 14.8 | 21.6 |
| 5-1-2 | 65 | 8.3 | 21.6 | 36.1 | 54.9 |
| 5-1-3 | 58 | 10.0 | 33.2 | 64.5 | 88.6 |
| Comparative Product Example 6 | 52 | 23.3 | 55.2 | 86.4 | 97.2 |
| Comparative Product Example 7 | 53 | 0.6 | 4.5 | 8.5 | 13.1 |
| Comparative Product Example 8 | 55 | 0.0 | 1.5 | 6.9 | 12.2 |
| Comparative Product Example 9 | 56 | 0.2 | 1.1 | 3.9 | 7.2 |
| 5-2 | 86 | 3.6 | 7.8 | 13.7 | 19.4 |
| 5-3 | 80 | 4.0 | 8.9 | 14.2 | 20.4 |
| 5-1-4 | 84 | 4.1 | 7.1 | 12.9 | 18.0 |
| 5-1-5 | 94 | 3.4 | 6.5 | 11.3 | 17.4 |
| 5-1-6 | 104 | 2.9 | 6.1 | 10.2 | 15.3 |

TABLE 17-2

| Product Example No. | Flavor | Mouthfeel |
|---|---|---|
| 5-1-1 | good | pleasant |
| 5-1-2 | good | slightly monoglyceride taste |
| 5-1-3 | good | slightly monoglyceride taste |
| Comparative Product Example 6 | good | some monoglyceride taste |
| Comparative Product Example 7 | bad | strong monoglyceride taste |
| Comparative Product Example 8 | bad | significant monoglyceride taste |
| Comparative Product Example 9 | bad | significant monoglyceride taste |
| 5-2 | good | pleasant |
| 5-3 | good | pleasant |
| 5-1-4 | good | pleasant |
| 5-1-5 | good | pleasant |
| 5-1-6 | good | pleasant |

As is seen from Table 17, overrun and shape retention of the ice creams obtained by the polypeptide composition (T-1) of the present invention (Product Example 5-1-1, 5-1-2 and 5-1-3) are improved as the amount of the polypeptide composition is increased. Further, as the amount of stearic acid monoglyceride is decreased, the flavor is improved.

On the other hand, the products of Comparative Product Examples 6 to 9 have very high shape retention. However, flavor is remarkably deteriorated.

In view of these evaluation results, both shape retention and flavor are improved by using the polypeptide composition of the present invention.

The products of Product Examples 5-2 and 5-3 which contain the different polypeptide compositions (T-2 and T-3) of the present invention show the same desired advantages of the present invention.

In addition, as is seen from Product Examples 5-1-4 to 5-1-6, when the amount of the polypeptide composition of the present invention is increased, the product has good flavor and overrun and shape retention is improved. Therefore, the polypeptide composition of the present invention can be used as an agent for regulating or controlling overrun.

PRODUCT EXAMPLE 7

Meringue

According to the formulation shown in Table 18, egg white meringue was prepared by each of the polypeptide compositions of T-1, T-2, T-3, t-1 and t-2 produced in the above Preparation Examples 1 to 3 and Comparative Preparation Examples 1 and 2.

TABLE 18

| Ingredients | Parts by weight |
|---|---|
| Frozen egg white (manufactured by Q.P. Corporation) | 100 |
| Sugar | 50 |
| Polypeptide composition | 1 |

The polypeptide composition (1 part) was added to liquid egg white (100 parts) obtained by thawing frozen egg white and the mixture was stirred with Kenwood Mixer (Model Pro KM-230 manufactured by Aikosha Seisakusho) equipped with whipper blades at a low speed (100 r.p.m.) for 30 seconds. To this was added sugar (50 parts) little by little with stirring at a high speed (300 r.p.m.) and the mixture was whipped for 3 minutes or 8 minutes to obtain two kinds of meringue having different meringue specific gravity. Then, the meringue was placed in a squeeze bag and squeezed out from a nozzle having a star-shaped cross section on a cooking sheet. It was baked in an oven at 105° C. for 1 hour and its appearance and inner state were observed. The results are shown in Table 19.

TABLE 19

| Polypeptide composition | Stirring (min.) | Specific gravity | State of meringue | State of baked meringue |
|---|---|---|---|---|
| T-1 | 3 | 0.123 | firm, creamy | sharp edge, fine inside texture |
| | 8 | 0.080 | " | sharp edge, fine inside texture |
| T-2 | 3 | 0.133 | firm, creamy | sharp edge, fine inside texture |
| | 8 | 0.100 | " | sharp edge, fine inside texture |
| T-3 | 3 | 0.140 | firm, creamy | sharp edge fine inside texture |
| | 8 | 0.120 | " | sharp edge fine inside texture |
| t-1 | 3 | 0.149 | firm, brittle less creamy | edge disappear inside lather broken, coarse texture |
| | 8 | 0.167 | firm, brittle less creamy | worse than 3 min. |
| t-2 | 3 | 0.152 | firm, brittle less creamy | edge disappear inside lather broken, coarse texture |
| | 8 | 0.171 | firm, brittle less creamy | worse than 3 min. |

TABLE 19-continued

| Polypeptide composition | Stirring (min.) | Specific gravity | State of meringue | State of baked meringue |
|---|---|---|---|---|
| Control (without addition of composition | 3 | 0.148 | firm, brittle less creamy | edge disappear inside lather broken, coarse texture |
| | 8 | 0.169 | firm, brittle less creamy | worse than 3 min. |

As is seen from Table 19, the meringue obtained by using the polypeptide composition t-1 or t-2 or the control meringue had less stability. Although the lather was firm, it was less creamy and brittle and broken by stirring.

When it was baked, the edge of the star-shape appearance of the meringue baked for 3 minutes was broken. The inside lather was also partly broken and had coarse texture. Further, the appearance of the meringue baked for 8 minutes was clearly distorted and deformed. The inside was hollow and was undesirably baked.

On the other hand, the meringue obtained by using the polypeptide composition T-1, T-2 or T-3 had good stability and good lather regardless of the stirring period. The resultant baked meringue had the same appearance as that before baking and the star-shape edge was clearly j maintained. Further, the baked meringue had good inside lather and fine texture. It was desirably baked.

PRODUCT EXAMPLE 8

Chiffon Cake

According to the formulation shown in Table 20, a chiffon cake was prepared by using the polypeptide composition T-1, T-2, T-3, t-1 or t-2 and egg white meringue.

TABLE 20

| Ingredients | Parts by weight |
|---|---|
| Meringue part | |
| Frozen egg white (Q. P. Corp.) | 192 |
| Sugar | 60 |
| Salt | 2 |
| Polypeptide composition | 2 |
| Egg yolk dough part | |
| Egg yolk | 80 |
| Sugar | 60 |
| Salad oil | 80 |
| Wheat flour (low gluten) | 140 |

Frozen egg white was thawed and to this liquid egg white were added the polypeptide composition and salt. The mixture was whipped with Kenwood Mixer (Model Pro KM-230 manufactured by Aikosha Seisakusho) equipped with whipper blades with stirring at a low speed (100 r.p.m.) for 30 seconds. Then, it was further stirred at a high speed (300 r.p.m.). After whipping for 1 minute, sugar was added little by little with stirring at high speed. In total, stirring at high speed was continued for 4 minutes to prepare egg white meringue. One third of this meringue was added to a uniform mixture of egg yolk, sugar, salad oil and wheat flour which was separately prepared and uniformly dispersed therein. To the resultant mixture was added the remaining meringue and they were gently mixed to obtain chiffon cake dough. The dough (140 g) was cast in a chiffon cake mold No. 4 and baked at 180° C. for 30 minutes to prepare a chiffon cake.

The chiffon cakes thus obtained were subjected to organoleptic evaluation by 10 panelists with scoring flavor and mouthfeel (5 grades, 5: excellent, 4: good, 3: normal, 2: bad, 1: very bad). In addition, dough stability was evaluated with respect to chiffon cakes obtained by allowing to stand the dough for 30 minutes. The results are shown in Table 21.

TABLE 21

| Poly-peptide composition | Specific gravity of meringue | Specific gravity of chiffon cake | | Flavor | Mouth-feel | Appear-ance |
|---|---|---|---|---|---|---|
| | | Immediately after preparation | After 30 min. | | | |
| T-1 | 0.12 | 0.34 | 0.34 | 4 | 5 | good |
| T-2 | 0.11 | 0.33 | 0.33 | 5 | 5 | good |
| T-3 | 0.14 | 0.35 | 0.36 | 5 | 4 | good |
| t-1 | 0.15 | 0.40 | 0.47 | 4 | 3 | volume loss |
| t-2 | 0.15 | 0.41 | 0.52 | 3 | 2 | volume loss |
| Control (without addition) | 0.15 | 0.39 | 0.49 | 5 | 3 | volume loss |

As is seen from Table 21, when the peptide composition T-1, T-2 or T-3 was used, meringue having lighter specific gravity was obtained. In addition, since meringue stability was improved, increase in specific gravity of dough was inhibited, thereby improving chiffon cake dough stability. The end product chiffon cake had superior overall evaluation of appearance, flavor and mouthfeel to those of the chiffon cake obtained by using t-1 or t-2 or the control chiffon cake.

PRODUCT EXAMPLE 9

Baked Meringue

To liquid egg white (100 parts) was added the polypeptide composition T-1 (0.25 part, 0.5 part or 1 part) and stirred with Kenwood Mixer (Model Pro KM-230 manufactured by Aikosha Seisakusho) equipped with whipper blades at a low speed (100 r.p.m.) for 30 seconds. Then, to this was added sugar (50 parts) little by little with stirring at a high speed (300 r.p.m.). In total, the stirring at the high speed was continued for 3 minutes to obtain meringue. According to the same manner, meringue without the polypeptide composition was also prepared.

Each meringue was frozen at −20° C. overnight and then allowed to thaw. The state of meringue thus thawed and denaturation of protein were evaluated. Further, baked meringue was prepared by using the thawed meringue according to the same manner as described in Product Example 7.

Denaturation of protein was evaluated by defoaming the thawed meringue with silicone, recovering denatured insoluble protein with centrifugation, washing the recovered insolubles with water, and then centrifuging to remove protein which was not denatured. The amount of protein which was not insolublized by freezing was determined by Lowry method and the amount of protein which was denatured by freezing was calculated on the basis of the amount of protein before freezing. The results are shown in Table 22.

TABLE 22

| Amount of T-1 added | Without addition | 0.25 part | 0.5 part | 1 part |
|---|---|---|---|---|
| Amount of denatured protein | 8.2% | 4.0% | 1.7% | 0.2% |
| State of meringue | much water separation, coarse lather | slightly water separation, fine lather | no water separation, fine lather | no water separation, fine lather |
| Baked meringue | lather break on squeeze, baking impossible | slightly deformation, baking possible | baking possible in the same way as that without freezing | baking possible in the same way as that without freezing |

As is seen from Table 22, when the meringue was frozen and stored, in the meringue obtained by without addition of T-1, protein was denatured, thereby damaging physical properties of the meringue. To the contrary, in the meringue obtained by addition of T-1, denaturation of protein due to freezing was prevented and the meringue had the same quality as that without freezing. Then, frozen storage of meringue which has been heretofore impossible in the prior art is possible, which results in improvement of workability of industrial scale production and is applicable to development of new meringue products.

PRODUCT EXAMPLE 10

Canned Milk Coffee Beverage

According to the formulation shown in Table 23, a canned milk coffee beverage was obtained by using the polypeptide composition of T-1, T-2, T-3, t-1 or t-2.

TABLE 23

| Ingredients | Parts by weight |
|---|---|
| Granulated sugar | 6.0 |
| Milk | 25.0 |
| Instant coffee (manufactured by Nestle) | 1.5 |
| Sodium bicarbonate | 0.13 |
| Sugar ester P1670 (manufactured by Mitsubishi Chemical Corp.) | 0.03 |
| Polypeptide composition | 0.5 |
| Water | 67.0 |
| Total | 100.16 |

To warm water (1005 g) at 60° C. were added sodium bicarbonate (1.95 g), the polypeptide composition (7.5 g), granulated sugar (90 g), sugar ester P1670 (0.45 g), milk (375 g) and instant coffee (22.5 g) and the mixture was stirred with a homomixer (manufactured by TOKUSHU KIKA KOKYO CO., LTD.) at 3,000 r.p.m. for 20 minutes to disperse these ingredients.

After confirming that pH of the mixture was 6.8, the mixture was homogenized with a high pressure homogenizer under pressure of 150 kg/cm² to obtain a coffee beverage. The beverage was filled in 200 g-cans and treated in a retort at 124° C. for 15 minutes and then cooled. The cans were divided into two groups and one groups were stored at 65° C. for 2 weeks. The other was stored at 25° C. for 2 weeks. After 2 weeks, all the cans were stored in a refrigerator at 5° C. for 2 days. Then, cans were opened and the contents were evaluated. The results are shown in Table 24.

TABLE 24

| Polypeptide composition | Oil ring formation about inside of neck part of can | Formation of Precipitation and agglomeration |
|---|---|---|
| T-1 | only thin oil ring | almost nothing |
| T-2 | only thin oil ring | almost nothing |
| T-3 | only thin oil ring | almost nothing |
| t-1 | a little formed | somewhat much |
| t-2 | much formed | much precipitate |
| Control (without addition) | much formed | much precipitate |

As is seen from Table 24, in the control, significant oil ring formation was recognized. In the beverage obtained by using the polypeptide composition t-1 or t-2, somewhat or much precipitation was observed. To the contrary, in the beverage obtained by using the polypeptide composition T-1, T-2 or T-3, less oil ring formation was observed and precipitation and agglomeration were scarcely observed.

When the amount of the polypeptide composition T-3 was decreased to 0.01 part in the above formulation, much oil ring formation was observed. On the other hand, when the amount of the polypeptide composition T-3 was increased to 3 parts in the above formulation, bad sulfur flavor and unpleasant bitterness were recognized and the resultant beverage was unsuitable for drinking.

The results of Table 24 are those of cans stored at 65° C. The similar tendency was observed with respect to cans stored at 25° C.

PRODUCT EXAMPLE 11

Canned Black Tea Beverage

According to the formulation shown in Table 25, a canned black tea beverage was obtained by using the polypeptide composition T-1, T-2, T-3, t-1 or t-2.

TABLE 25

| Ingredients | Parts by weight |
|---|---|
| Commercially available canned black tea beverage (Royal Milk Tea manufactured by Japan Cocacola) | 100 |
| Polypeptide composition | 0.5 |
| Total | 100.5 |

The polypeptide composition was dispersed in the commercially available canned tea beverage and the dispersion was homogenized with a high pressure homogenizer (TOKUSHU KIKA KOGYO CO., LTD.) at pressure of 150 kg/cm², followed by filling in 200 g-cans, treating in a retort at 124° C. for 15 minutes and cooling. The cans were divided into two groups and one group was stored at 65° C. for 2 weeks. The other group was stored at 25° C. for 2 weeks. After 2 weeks, all the cans were stored in a refrigerator at 5° C. for 2 days. Then, cans were opened and the contents were evaluated. The results are shown in Table 26.

TABLE 26

| Polypeptide composition | Oil ring formation about inside of neck part of can | Formation of Precipitation and agglomeration |
|---|---|---|
| T-1 | only thin oil ring | almost nothing |
| T-2 | only thin oil ring | almost nothing |
| T-3 | only thin oil ring | almost nothing |
| t-1 | a little formed | somewhat much |
| t-2 | much formed | almost nothing |
| Control (without addition) | much formed | almost nothing |

As is seen from Table 26, in the control, significant oil ring formation was recognized. In the beverage obtained by using the polypeptide composition t-1, precipitation and agglomeration were somewhat observed. In the beverage obtained by using the polypeptide composition t-2, although precipitation was little, oil ring formation was almost the same as that of the control and addition-of t-2 did not give any advantages. To the contrary, in the beverage obtained by using the polypeptide composition T-1, T-2 or T-3, less oil ring formation was observed and precipitation and agglomeration were scarcely observed.

When the amount of the polypeptide composition T-3 was decreased to 0.01 part in the above formulation, much oil ring formation was observed (inhibition of oil ring formation was scarcely recognized). On the other hand, when the amount of the polypeptide composition T-3 was increased to 3 parts in the above formulation, bad sulfur flavor and unpleasant bitterness were recognized and the resultant beverage was unsuitable for drinking.

The results of Table 26 are those of cans stored at 65° C. The similar tendency was observed with respect to cans stored at 25° C.

PRODUCT EXAMPLE 12

Tempura

According to the formulation shown in Table 27, batter was prepared by using the polypeptide composition T-1, T-2, T-3, t-1 or t-2.

TABLE 27

| Ingredients | Parts by weight |
|---|---|
| Wheat flour (low gluten) (Violet manufactured by Nisshin Flour Milling Co., Ltd.) | 45 |
| Corn starch | 49 |
| Thickener (polysaccharide MY135 manufactured by TAIYO KAGAKU CO., Ltd.) | 1.2 |
| Salt | 2.5 |
| Polypeptide composition | 1.0 |
| Fats and oils (Unishort K manufactured by Fuji Oil CO., Ltd.) | 5.0 |
| Water | 110 |
| Total | 213.7 |

The ingredients were mixed and stirred with Kenwood Mixer (manufactured by Aikosha Seisakusho) to prepare butter. Sweet potato sliced into square rods (10 g) were coated with the batter (20 g) and fried at 180° C. for 3 minutes in soybean refined oil (manufactured by Fuji Oil Co., Ltd.). The fried sweet potato (tempura) was stored in a refrigerator for 2 days and then tasted. Mouthfeel (softness) of the batter coat was evaluated by 10 panelists by scoring (5 grades, average score 3 or higher was evaluated as good). The results are shown in Table 28.

TABLE 28

| Polypeptide composition | Mouthfeel |
|---|---|
| T-1 | 4.8 |
| T-2 | 4.9 |
| T-3 | 4.8 |
| t-1 | 2.0 |
| t-2 | 2.6 |
| Control (without addition) | 1.4 |

As is seen from Table 28, in the control, mouthfeel of the coating after storage was too hard and was changed to brittle. Thus, it was very badly evaluated. On the other hand, in the coating obtained by the polypeptide composition T-1, T-2 or T-3, mouthfeel was soft and very good, though light mouthfeel was somewhat decreased in comparison with that before storage. In the coating obtained by the polypeptide composition t-1 or t-2, although mouthfeel was improved in comparison with the control, it was yet badly evaluated.

When the amount of the polypeptide composition T-2 in the above formulation was decreased to 0.04 part, the score was 2.0 and was hardly differentiated from the control. When the amount of the polypeptide composition T-2 in the above formulation was increased to 6.0 parts, the score was 2.8 and heavy mouthfeel was recognized in addition to brittle mouthfeel. This was undesired.

PRODUCT EXAMPLE 13

Pork Cutlet

According to the formulation shown in Table 29, batter was prepared by using the polypeptide composition T-1, T-2, T-3, t-1 or t-2.

TABLE 29

| Ingredients | Parts by weight |
|---|---|
| Wheat flour (low gluten) (Violet manufactured by Nisshin Flour Milling Co., Ltd.) | 45 |
| Potato starch | 45 |
| BJ-2 (modified α-starch manufactured by Nichiden Kagaku Co., Ltd.) | 10 |
| Fats and oils (Palm Ace manufactured by Fuji Oil Co., Ltd.) | 100 |
| Polypeptide composition | 1.0 |
| Water | 180 |
| Total | 381.0 |

The ingredients were mixed and stirred with Kenwood Mixer (manufactured by Aikosha Seisakusho) to prepare butter. Frozen pork loin slice (30 g) was coated with the batter (20 g) and then with raw crumbs (screened through 2.5 mesh manufactured by Kyoei Food Co., Ltd., 14 g) and fried at 180° C. for 3 minutes in soybean refined oil (manufactured by Fuji Oil Co., Ltd.). The fried pork meat was frozen, stored in a freezer at −18° C. for 10 days, further stored in a refrigerator for 2 days and then tasted. Mouthfeel (softness) of the batter coat was evaluated by 10 panelists by scoring (5 grades, average score 3 or higher was evaluated as good). The results are shown in Table 30.

TABLE 30

| Polypeptide composition | Mouthfeel |
|---|---|
| T-1 | 3.1 |
| T-2 | 3.6 |
| T-3 | 3.5 |
| t-1 | 2.4 |
| t-2 | 2.6 |
| Control (without addition) | 1.0 |

As is seen from Table 30, in the control, mouthfeel of the coating after storage was too hard and was changed to brittle. Thus, it was very badly evaluated. On the other hand, in the coating obtained by the polypeptide composition T-1, T-2 or T-3, mouthfeel was soft and very good, though light mouthfeel was somewhat decreased in comparison with that before storage. In the coating obtained by the polypeptide composition t-1 or t-2, although mouthfeel was improved in comparison with the control, it was yet badly evaluated.

When the amount of the polypeptide composition T-2 in the above formulation was decreased to 0.04 part, the score was 1.0 and was hardly differentiated from the control. When the amount of the polypeptide composition T-2 in the above formulation was increased to 6.0 parts, the score was 2.6 and heavy mouthfeel was recognized in addition to brittle mouthfeel. This was undesired.

PRODUCT EXAMPLE 14

Pancake

According to the formulation shown in Table 31, a pancake was prepared by using the polypeptide composition of T-1.

TABLE 31

| | Parts by weight | | | |
|---|---|---|---|---|
| | Example | Comparative Example | | |
| Ingredients | 14 | 10 | 11 | 12 |
| Polypeptide composition (T-1) | 2 | 0 | 0.02 | 20 |
| Hot cake mix (manufactured by Morinaga Seika Co., Ltd.) | 198 | 200 | 200 | 180 |
| Whole egg | 57 | 57 | 57 | 57 |
| Milk | 150 | 150 | 150 | 150 |
| Total | 407 | 407 | 407.02 | 407 |

Hot cake mix and the polypeptide composition were mixed with Kenwood Mixer (Aikosha Seisakusho) and then to the mixture were added whole egg and milk. The mixture was further stirred with Kenwood Mixer at a low speed for 30 seconds. The resultant mixture (40 g) was placed on a hot plate and baked each side at 160° C. for 9 minutes (total 18 minutes) to obtain a pancake. The pancakes thus obtained were divided into two groups and one group was stored in a refrigerator overnight (condition 1). The other group was stored in a freezer for one week and then allowed to thaw (condition 2).

Mouthfeel (softness and roughness) of the pancake was evaluated by 5 panelists (5 grades, 5: excellent, 1: very bad, evaluated by the average score). The results are shown in Table 32.

TABLE 32

| | Mouthfeel | |
|---|---|---|
| Pancake | Condition 1 | Condition 2 |
| Example 14 | 3.4 | 4.2 |
| Comparative Example 10 | 2.4 | 2.8 |
| Comparative Example 11 | 2.4 | 2.6 |
| Comparative Example 12 | 1.6 | 1.6 |

As is seen from Table 32, the pancake of Example 14 had soft and good mouthfeel. On the other hand, the pancake of Comparative Example 10 had dry mouthfeel and it was changed to hard and brittle mouthfeel. The pancake of Comparative Example 11 has similar mouthfeel to that of Comparative Example 10 and was not good. In the pancake of Comparative Example 12, dough was largely changed dough before baking, resulting high viscosity and inferior physical property for handling. Mouthfeel of the pancake was hard and bad.

As described hereinabove, according to the present invention, the polypeptide composition having excellent whipping and emulsifying capabilities which can be used in the fields of food, cosmetics, toiletries, medicine and the like can be obtained in an excellent yield.

What is claimed is:

1. A polypeptide composition comprising independently hydrolyzed 7S and 11S components of a soybean protein.

2. A polypeptide composition derived from 7S and 11S components of a soybean protein and having the following properties:
   1) molecular weight of its main constituent polypeptide ranging from 5,000 to 35,000 upon analysis by mercaptoethanol-containing SDS polyacrylamide gel electrophoresis;
   2) molecular weight of a main peak obtained by gel filtration being about 8,000, and 70% or more of the whole peak area having a molecular weight ranging from 5,000 to 30,000 and 20% or less of the whole peak area having a molecular weight of less than 5,000; and
   3) a solubilization degree with 0.22 M trichloroacetic acid (TCA) of 30 to 90%.

3. The polypeptide composition according to claim 1 or 2, which comprises a emulsifying capability of 0.15 or higher at pH 4.0, 0.5 or higher at pH 5.5, and 0.8 or higher at pH 7.

4. The polypeptide composition according to claim 1 or 2, which comprises a whipping capability of 250 or more.

5. A process for producing a polypeptide composition, which comprises independently hydrolyzing 7S and 11S components of a soybean protein to obtain the polypeptide composition, said polypeptide composition comprising hydrolysates of said 7S and said 11S components.

6. The process according to claim 5, wherein either the 7S component or the 11S component in the soybean protein is selectively hydrolyzed, followed by hydrolyzing a fraction comprising the non-hydrolyzed component without separating the fraction comprising the non-hydrolyzed component from a fraction comprising the hydrolyzed component to obtain the polypeptide composition.

7. The process according to claim 5, wherein either the 7S component or the 11S component in the soybean protein is selectively hydrolyzed, followed by separating a fraction comprising the non-hydrolyzed component from a fraction comprising the hydrolyzed component, hydrolyzing the separated fraction and mixing the hydrolyzed fraction with the selectively hydrolyzed fraction to obtain the polypeptide composition.

8. The process according to claim 6 or 7, wherein the 11S component in the soybean protein is selectively hydrolyzed.

9. The process according to claim 8, wherein the selective hydrolysis is carried out within 4 hours until a solubilization degree with 0.22 M TCA reaches 10 to 50%.

10. The process according to claim 8, wherein the selective hydrolysis is carried out by using a scarcely denatured soybean protein as a substrate at a pH of 3.0 or lower and at a temperature of 45° C. or lower.

11. The process according to claim 8, wherein the hydrolysis of the fraction comprising the non-hydrolyzed component is carried out at a pH of higher than 3.0, or at a temperature of higher than 45° C.

12. The process according to claim 11, wherein the hydrolysis of the fraction comprising the non-hydrolyzed component is carried out at a pH of 3.0 or lower and at a temperature of 50° C. or higher.

13. The process according to claim 6 or 7, wherein the 7S component in the soybean protein is selectively hydrolyzed.

14. The process according to claim 13, wherein the selective hydrolysis is carried out within 2 hours until a solubilization degree with 0.22 M TCA reaches 10 to 50%.

15. The process according to claim 13, wherein the selective hydrolysis is carried out by using a scarcely denatured soybean protein as a substrate at a pH of 3.0 to 8.0 and at a temperature of 50° C. or higher.

16. The process according to claim 15, wherein the hydrolysis of the fraction comprising the non-hydrolyzed component is carried out at a pH of 3.0 or lower and at a temperature of 45° C. or lower.

17. The process according to claim 6 or 7, wherein the resultant polypeptide composition or the hydrolysate of the fraction comprising the non-hydrolyzed component is maintained at a pH of 2 to 4 or a pH of 5 to 9 and optionally with an addition of a hydroxide or salt of an alkaline earth metal to remove insolubles formed.

18. The process according to claim 17, wherein the resultant polypeptide composition or the hydrolysate of the fraction comprising the non-hydrolyzed component is treated with phytase and then maintained at a pH of 2 to 4 or a pH of 5 to 9 to remove insolubles formed.

19. A surfactant comprising, as an effective component, the polypeptide composition according to claim 1 or 2.

20. An emulsifying agent comprising, as an effective component, the polypeptide composition according to claim 1 or 2.

21. A whipping agent comprising, as an effective component, the polypeptide composition according to claim 1 or 2.

22. A food additive comprising the polypeptide composition according to claim 1 or 2.

23. The food additive according to claim 22, which is added to ices.

24. The food additive according to claim 22, which is added to meringues.

25. The food additive according to claim 22, which is added to spread pastes.

26. The food additive according to claim 22, which is added to beverages.

27. The food additive according to claim 22, which is added to starches.

28. A food product comprising the food additive according to claim 22.

29. The food product according to claim 28, which is an emulsified product.

30. The food product according to claim 28, which is a whipping or whipped product.

31. The food product according to claim 28, which is ices.

32. The food product according to claim 28, which is meringues.

33. The food product according to claim 28, which is spread pastes.

34. The food product according to claim 28, which is beverages.

35. The food product according to claim 28, which is farinaceous products.

\* \* \* \* \*